(12) United States Patent
Nguyen

(10) Patent No.: US 7,548,313 B2
(45) Date of Patent: Jun. 16, 2009

(54) COMPACT AND RUGGED IMAGING RAMAN SPECTROGRAPH

(76) Inventor: Quang-Viet Nguyen, 4795 Wethersfield Ct., Richmond Hts., OH (US) 44143

( * ) Notice: Subject to any disclaimer, the term of this patent is extended or adjusted under 35 U.S.C. 154(b) by 300 days.

(21) Appl. No.: 11/497,893

(22) Filed: Aug. 2, 2006

(65) Prior Publication Data
US 2008/0030728 A1    Feb. 7, 2008

(51) Int. Cl.
G01J 3/28    (2006.01)
(52) U.S. Cl. ..................................... 356/328
(58) Field of Classification Search ............. 356/301, 356/328
See application file for complete search history.

(56) References Cited

U.S. PATENT DOCUMENTS

| | | | |
|---|---|---|---|
| 3,951,526 A | 4/1976 | Grossman | |
| 5,011,284 A | 4/1991 | Tedesco et al. | |
| 5,377,004 A | 12/1994 | Owen et al. | |
| 5,442,439 A | 8/1995 | Battey et al. | |
| 5,530,565 A | 6/1996 | Owen | |
| 5,587,847 A | 12/1996 | Chang et al. | |
| 5,644,396 A | 7/1997 | Hopkins, II | |
| 5,751,413 A | 5/1998 | Chung et al. | |
| 5,841,139 A * | 11/1998 | Sostek et al. | 250/339.12 |
| 5,995,221 A | 11/1999 | Slutter et al. | |
| 6,028,667 A | 2/2000 | Smith et al. | |
| 6,583,873 B1 | 6/2003 | Goncharov et al. | |
| 6,657,724 B1 | 12/2003 | Dunstan et al. | |
| 6,690,467 B1 * | 2/2004 | Reel | 356/328 |
| 6,937,331 B1 * | 8/2005 | Nguyen | 356/305 |
| 7,385,692 B1 * | 6/2008 | Nguyen | 356/301 |
| 2004/0073120 A1 * | 4/2004 | Motz et al. | 600/478 |
| 2007/0188749 A1 * | 8/2007 | Brady et al. | 356/301 |

OTHER PUBLICATIONS 3 pages from Princeton Instruments Action,2000 -2005 Roper Scientific, Inc.; Spectroscopy product brochure, HTS Lens Spectrograph.
3 pages from Kaiser Optical Systems, Inc. product brochure; A Rockwell Collins Company; HoloSpec ƒ / 1.81; Holographic Imaging Spectrograph.
2 pages from Process Instruments product brochure specifications.

* cited by examiner

*Primary Examiner*—Kara E Geisel
(74) *Attorney, Agent, or Firm*—Hudak, Shunk & Farine Co. LPA

(57) ABSTRACT

A compact and robust imaging Raman spectrograph has a collimating input lens assembly, a spectral filter assembly, a transmission diffraction grating, a focusing lens assembly, and a light detector. The spectral filter assembly is located between the two lenses and comprises a notch or long-pass filter optical interference filter, a plurality of optical channel plates for limiting the optical acceptance angle of the light passing the optical interference filter, and a transmission diffraction grating, all mounted in a single assembly. The spectral filter assembly permits a very high degree of elastically scattered light rejection and excellent stray-light reduction and management, while permitting a high level of optical throughput to maximize the signal of the weakly scattered Raman signal.

25 Claims, 7 Drawing Sheets

COMPACT AND RUGGED IMAGING RAMAN SPECTROGRAPH

FIELD OF INVENTION

The present invention relates to optical spectroscopy systems for measuring dispersed light wavelengths for the purposes of producing an optical spectrogram. In particular, the present invention is directed to systems and processes for performing Raman spectroscopy in the so called imaging mode whereby the spectrogram is three dimensional: wavelength, spatial extent, and signal intensity. In specific embodiments, the invention allows for the use of Raman spectroscopy to analyze the chemical compositions of substances using the Raman-effect through an attached fiber optic Raman probe with a linearly disposed array of optical fibers, or via free-space lens-coupled configurations.

BACKGROUND OF THE INVENTION

The applications and principles of Raman spectroscopy are well-known and thus will not be described here in detail. Briefly, Raman spectroscopy is an in-elastic light scattering technique that that uses the Raman-effect. In a typical Raman spectroscopy system, an excitation laser illuminates a substance (more specifically, a sample of a substance) containing various molecules that provide the Raman scattering signal which is then collected to permit the determination of the various concentrations of the chemical constituents in the substance, and even their temperature from their characteristic Raman scattering signature provided in the spectrogram. Common to all methods of Raman spectroscopy (non-Fourier transform methods) systems is a requirement for a device or means to disperse the scattered light radiation into constituent wavelengths for the purposes of producing a Raman spectrogram showing the individual spectrally resolved vibrational or pure-rotational line intensities of the scattering species under investigation. Additionally, all Raman spectroscopy systems require a means of removing or attenuating the incident laser excitation wavelength which is many orders of magnitude (typically >$10^6$) more intense than the scattered Raman signal.

In the field of Raman spectroscopy, numerous types of spectrometers and spectrographs have been developed to address the unique requirements of high signal throughput necessitated by the low Raman signal intensity, efficient rejection of the laser excitation wavelength, good spectral resolution, and good spatial resolution for multi-channel imaging spectrographs. Systems that have been used for these purposes include: conventional Czerny-Turner reflection spectrographs; spectrographs with combined dispersive/focusing elements such as curved gratings; axially-transmissive lens spectrograph designs; systems using holographic volume phase gratings; ion-beam etched curved gratings with blaze angles; multiple spectrographs in double-subtractive mode followed by a conventional dispersive mode, also known as a triple-spectrograph. Most of these systems have been developed for use in a laboratory environment, and as a result, can be quite fragile and sensitive to misalignment, they also lack the robustness, compactness, and cost-effective construction required for routine deployment in the field such as on-line industrial process automation and control. There are more rugged systems that were developed for use in the field such as the design described in U.S. Pat. No. 5,011,284 to Tedesco et al; Smith et al., U.S. Pat. No. 6,028,667 to Smith et al; U.S. Pat. No. 5,644,396 to Hopkins, and even larger systems such as the Holospec f/1.8i manufactured by Kaiser Optical Instruments, Ann Arbor, Mich. However, these prior-art designs do not incorporate design methodologies shown in the present design which incorporates features that will enable a simple, rugged, cost-effective and easy-to-use design, with a combined spectral filter assembly for the purposes of rejecting the elastic light scattering without the use of one or more additional lens assemblies.

SUMMARY OF THE INVENTION

The present invention seeks to provide a compact and robust imaging spectrograph that is suitable for field-deployable Raman spectroscopy for real-time industrial and chemical process measurement and control. According to one embodiment of the invention, an imaging Raman spectrograph utilizes commercially available aberration-corrected compound optical lenses with focal lengths ranging from about 10 mm to 100 mm, with f numbers ranging from f/1.0 to f/2.8, an elastically scattered light, or Rayleigh-line rejection filter assembly comprising a multi-layer dielectric interference filter or a holographic notch filter, a transmission grating, an optional beam folding mirror, and an optical housing and frame to locate and align the previously mentioned optical components in a robust and compact mechanical assembly. The spectrograph further has the advantage of using a relay lens assembly consisting of a first lens or lens assembly (a lens assembly refers to a cohesive group of aberration corrected lens elements mounted in such a way as to act as a single lens with an effective focal length), which relays the image of the input slit to the second lens or lens assembly, which images the spectrally dispersed image of the slit onto the detector image plane. This relay lens assembly requires only two lenses or lens assemblies, rather than the four lens or lens assemblies typically required by the prior art in order to accommodate a spectral pre-filter relay lens assembly that precedes the dispersive relay lens or lens assembly. The preferred embodiment of the invention is modified from a traditional understanding of a relay lens assembly insofar as a dispersive element is provided between the relay lens elements Specifically, the dispersive elements is a transmission diffraction grating. In addition, the spectrograph includes a first lens or lens assembly, a spectral filter assembly that rejects the elastically scattered light from the excitation source, a transmission grating, and a second lens or lens assembly. The use of this relay lens assembly also permits the user to selectively change the first and second lens or lens assemblies, and specifically to change the focal lengths of these lenses in order to tailor the magnification or the spectral band width of the spectrograph. Furthermore, the relay lens or lens assembly may include a mechanical or electromechanical shutter to block the transmission of light through the relay lens or lens assembly.

Additionally, the present invention may be used with a fiber optical light guide composed of a plurality of optical fibers arranged in a linear array to serve the function of an optical slit. The optical fibers may be used to transmit and carry Raman scattering light signals for the purposes of dispersion and recording in the spectrograph.

Additionally, the system may be used for other types of optical spectroscopy such as emission, absorption or fluorescence spectroscopy, or any application requiring a compact imaging spectrograph in the 380 nm to 1000 nm range with a reciprocal dispersion ranging from about 10 nm/mm to about 50 nm/mm with a spectral resolution ranging from about 0.3 nm to about 3 nm, with a slit image height up to about 12 mm.

Additionally, the spectrograph system described in the present invention can be constructed from a one-piece 'unibody' type design to minimize both parts and to provide a more secure and reliable system of mounting the optical components to minimize the effects of misalignments due to mechanical movement between various optical components. The unibody construction can be effected by various means such as computer numerical controlled (CNC) machining whereby a solid block of metal such as aluminum is formed by removing large amounts of internal material corresponding to the cavities inside the housing.

According to another embodiment, the unibody construction can also be implemented using a casting or molding process with minimal post-casting conventional machining operations.

According to another embodiment, the unibody construction can also be made using 3-dimensional stereo lithography techniques utilizing laser forming or thermal printing techniques.

According to another embodiment, the spectrograph can utilize a transmission volume phase holographic (VPH) grating to enhance the optical throughput and efficiency. Such gratings have transmission efficiencies as high as 90% in the visible wavelength range. The VPH grating will typically be mounted in an angled fashion to maximize the grating efficiency by satisfying the Bragg angle condition of the grating.

These and other variations of the present invention will be described in or be apparent from the following description of the preferred embodiments.

BRIEF DESCRIPTION OF THE DRAWINGS

For the present invention to be easily understood and readily practiced by those skilled in the art, the present invention will now be described, for purposes of illustration and not limitation, in conjunction with the following figures.

DETAILED DESCRIPTION OF THE PREFERRED EMBODIMENTS

Figure 1:
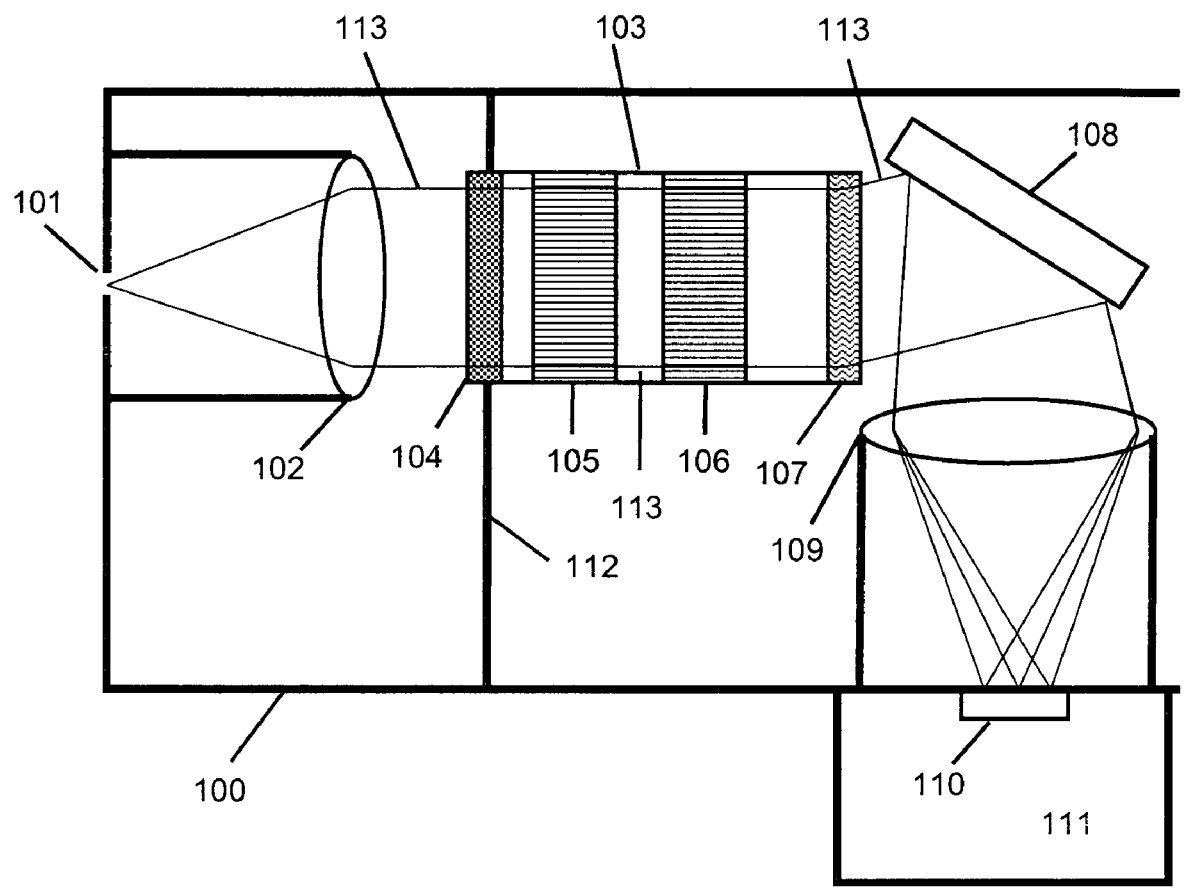
FIG. 1 illustrates an imaging Raman spectrograph utilizing commercially available compound lenses, a laser line rejection filter assembly, a grating, and a beam-folding mirror, according to one embodiment of the present invention.

An embodiment of the compact and rugged imaging Raman spectrograph of the present invention is schematically shown in FIG. 1. The spectrograph 100 has an input optical slit 101 that admits light into the spectrograph, and at the same time serves to spatially limit the input slit image dimensions for the purposes of determining the spectral resolution and spatial extent of the slit image. The slit will have dimensions ranging from 5 µm to 200 µm in the spectral dimension, and heights ranging from 1 mm to 12 mm in spatial dimension. The light from the slit is then collimated preferably by a commercially available multi-element anti-reflection (AR) coated compound lens 102 (or lens assembly). The lens 102 has typical focal lengths, depending on the resolution and spectral range requirements that range from 10 mm to 100 mm, and with f/#'s (focal ratio number) ranging from f/1.0 to f/2.8. The invention permits the user to change this lens in order to change the focal length which permits the user to change the spectral resolution and spectral range for a given device. The lens 102 may have one or more aspherical surfaces to reduce optical aberrations. Typical lenses suitable for this application include C-mount ½-inch to 1-inch format closed circuit TV (CCTV) video lenses such as those manufactured by Pentax/Cosmicar, including for example, the 50 mm f/1.4 1-inch format lens with locking focus and aperture rings. The collimated light ray bundle 113 leaving lens 102 impinges onto a spectral filter 104 designed to reject the elastically scattered light near the laser excitation wavelength. The filter 104 can be either a long-pass or notch-filter, and can be constructed, but not limited to, the following techniques: multi-layer dielectric coatings, volume-phase holographic (VPH) techniques, color-absorbing glass (such as Schott OG 550 for 532 nm laser excitation), or atomic/molecular absorbing filters such as iodine or rubidium vapor.

The spectral filter 104, in the case of multi-layer dielectric construction, such as those manufactured by Semrock Inc., Rochester, N.Y., or of VPH type construction, such as those manufactured by Kaiser Optical Systems, Ann Arbor, Mich., will have a limited angle of incidence with which the spectral laser line will be sufficiently rejected, and/or absorbed. This angle is typically no greater than about 5 degrees. For the purpose of ensuring that only light within this cone angle is transmitted, thus reducing the amount of background, off-axis light contributions from reaching past the spectral filter, the spectral filter 104 is mounted as part of a spectral filter assembly 103 which serves to reduce and capture the stray light that would otherwise be admitted beyond the plane of the filter 104. The spectral filter assembly 103 is comprised of the spectral interference filter 104, opaque optical channel plates 105 & 106, separated by a gap 113, the purpose and function of which will be explained later. The housing for the spectral filter assembly 103 also includes the optical transmission grating element 107. In this way, any stray light that is able to get past the filter 104, is then caught and absorbed by the opaque and low-light scattering walls of the optical channel plates 105 & 106, and the opaque and low-light scattering walls of the spectral filter assembly housing 103, which can be treated with a flat-black paint and/or non-reflective black flocking material.

The spectral filter assembly 103 serves to attenuate the elastically scattered light intensity by at least $10^6$, and possibly more, while at the same time, permitting a large amount of the non-elastically scattered light, the Raman scattered component, from passing through for further analysis. The transmission grating 107 mounted to the exit of the spectral filter assembly 103, disperses the light into different spectral wavelengths according to the well-known grating equation. For the purposes of Raman scattering applications in the visible and near IR wavelength ranges, the transmission grating can have groove frequencies ranging from about 150 lines/mm to 2400 lines/mm. The transmission grating can be either a standard ruled and blazed grating, such as those manufactured by Optometrics LLC, Ayer, Mass., or a volume phase holographic (VPH) type where the grating is formed by the interference of two laser beams in a dichromated gelatin material, such as those manufactured by Kaiser Optical Systems, Inc., Ann Arbor, Mich., or by other companies well-versed in the art. However, for grating groove frequencies greater than 800 lines/mm, ruled transmission gratings have low optical transmission efficiencies due to the highly-oblique angles formed between the groove face normal and the exiting light beam which results in high fraction of Fresnel reflection losses. Thus, for higher dispersion gratings requiring higher groove frequencies, VPH transmission gratings which still have efficiencies near 90% at the higher groove frequencies are preferred.

The light dispersed by the grating 107 then exits the spectral filter assembly 103 and is directed by a beam folding or turning mirror 108 which serves to fold and make the optical assembly more compact, to an imaging lens 109 which serves to focus the spectrally dispersed wavelengths onto a 2-dimensional light-sensitive detector array 110. The beam folding mirror is a first-surface mirror 108, is typically made from a polished glass or fused silica substrate coated with aluminum or silver and a protective overcoat also provides a convenient means of adjusting the central wavelength of the spectrograph through lateral tilting, making alignment and setup much easier to accomplish, rather than forcing the lateral translation of the detector imaging plane 110. The imaging lens 109 is preferably a commercially available multi-element AR coated lens of similar focal length and f/# as the input collimation lens 102. However, in accordance with another aspect of the invention, the use of different focal length lenses for the imaging lens 109, permits different spectral ranges, resolutions, and also permits the optical throughput to be adjusted and optimized. For example, by making the focal length of lens 109 larger than lens 102, an image magnification can be accomplished, as in the case of a 25 mm f/1.4 input lens 102 and a 50 mm f/1.4 imaging lens 109, a magnification of 2× can be achieved, and the effects of vignetting can be minimized with a larger imaging lens 109 diameter, of course at the expense of spectral resolutions. However, for cases where it is more important to match the input slit dimensions to the pixel dimensions of the detector array 110, a slight magnification can prove beneficial.

The detector array 110 can be made using for example, a charge-coupled device (CCD) with discrete pixels to detect both the spectral and spatial distribution of the signals originating from the optical input slit 101. The CCD detector sensor array 110 is mounted to a CCD camera assembly 111 which provides the ancillary electronics and control to affect an electronic readout and/or digitization of the optical signals reaching the sensor array 110. The sensor array 110, can have pixel dimensions ranging, but not limited to, 64 pixels to 2048 pixels wide in the spectral and spatial dimension, and can have pixel element dimensions ranging from 5 µm to 50 µm per pixel. The pixel dimensions and array size are chosen by those skilled in the art to allow a good match between the desired spectral resolution, spectral range, signal noise, and cost. Furthermore, the CCD array may be preceded by an image intensifier or scintillator material to enhance the low-light capability, to provide temporal gating, and/or spectral range. Furthermore, the sensor array material and camera 111 technologies may also be made using complimentary metal oxide semiconductors (CMOS) to enhance readout speeds, back-illuminated CCD (BI-CCD) to enhance the quantum efficiency, and/or electron-multiplication CCD (EM-CCD) technologies whereby electronic gain can be effected on-chip during the charge readout process. Examples of suitable CCD camera manufacturers include Andor Technology PLC, Belfast, Northern Ireland, Roper Scientific Inc., Trenton, N.J. Finally, the sensor array 110 plane of incidence may be tilted by a small amount about the vertical axis shown in FIG. 1 (typically <2 degrees) to optimize the chromatic aberrations of lens system to account for a difference in the focal plane distance between the widely disparate wavelengths.

Figure 2:
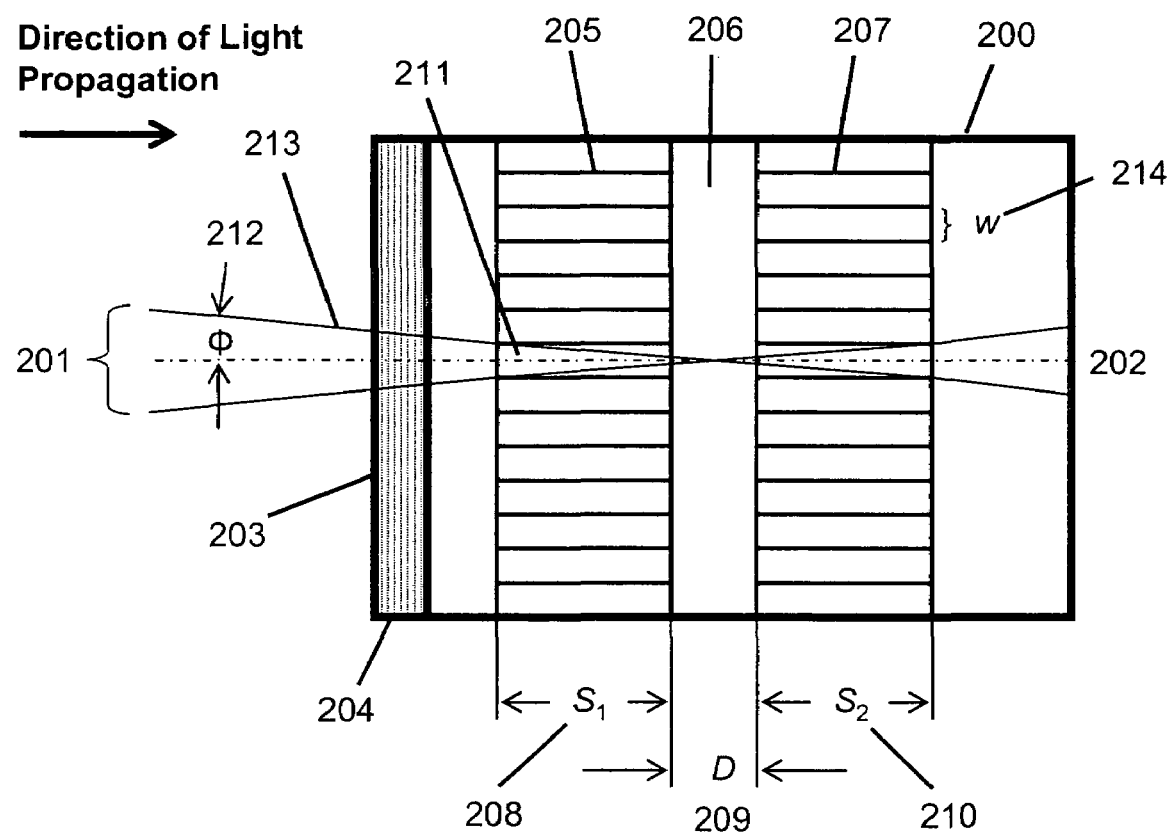
FIG. 2 provides a schematic of the laser line rejection filter assembly internals, according to one embodiment of the present invention.

An embodiment of the spectral filter assembly 103 in FIG. 1 is schematically depicted in greater detail in FIG. 2. Here the light, for one of many bundle of rays, entering the spectral filter assembly 200, is shown as a bundle of rays 213, subtended by the full angle of entry 201, limited by an entrance half-angle of incidence ($\theta$) 212 via the opaque obstructions provided by the optical channel plates 205 & 207 with optical channel width (w) 214. The bundle of rays 213 enter the spectral filter 204 by first passing through the filter entrance surface 203, which is preferably AR coated to reduce the stray-light scattering. The optical channel plates 205 & 207 can be conveniently constructed using thin-wall aluminum honeycomb matrix materials, rectangular or square grate plates, or bundles of tightly packed and affixed circular tubes to form a hexagonal closest packed array structure similar to a honeycomb. By using two (or more) optical channel plates 205 & 207, separated by a gap 206 of dimension (D) 209, a smaller angle of incidence 212 can be constructed with larger channel widths 214, which are easier to manufacture and more cost effective, and more importantly, have a smaller effect on the degradation of the image quality than plates with very narrow channel widths.

A further advantage of using multiple optical channel plates is that it permits the plates to be more easily coated or painted with a matte-black spray paint for the purposes of serving as a light blocking/absorbing material than an equivalent single thick optical channel plate. The optical channel plates 205 & 207 have a thickness of ($S_1$) 208, and ($S_2$) 210, respectively. From geometric considerations, the half-angle of incidence ($\theta$) 212 is thus given by the following relation:

$$\theta = \text{TAN}^{-1}\left(\frac{w}{S_1 + D + S_2}\right). \quad (1)$$

From Eqn. 1, we can see that the gap dimension (D) 209, in effect, permits a larger value of the optical channel width (w) 214. The light rays leaving the optical filter assembly impinge on a transmission grating mounted at the location shown by 202. From Eqn. 1, it can also be seen that the half-angle of incidence ($\theta$) 212 can be further reduced by using more than two optical channel plates, which successively add more terms $S_N$+D to the denominator of Eqn. 1, where $S_N$ is the thickness of the $N^{th}$ plate, thereby minimizing the half-angle of incidence ($\theta$) 212.

Figure 3:
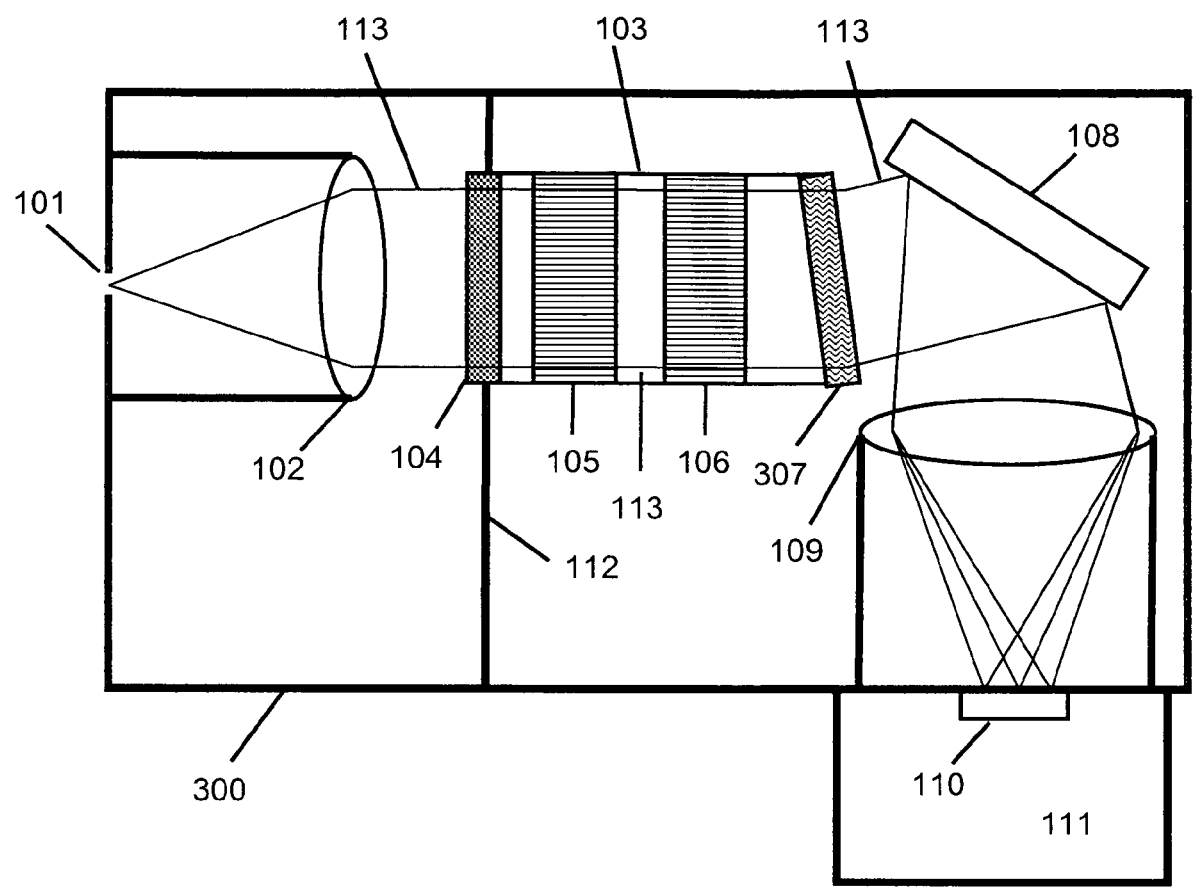
FIG. 3 illustrates an imaging Raman spectrograph similar to that described in FIG. 1 with the exception of a holographic volume phase grating element, according to an alternate embodiment of the present invention.

FIG. 3, schematically depicts an alternate embodiment of the present invention, showing a tilted transmission grating 307 mounted to the spectral filter assembly 103. The tilted transmission grating is especially useful for the volume phase holographic (VPH) type gratings which often have a Bragg angle entrance and exit ray requirement for maximum efficiency. For example, a 1200 line/mm VPH grating with symmetric entrance and exit angles will have the grating mounted at approximately 21 degrees with respect to the input beam axis, and the exiting diffracted first-order beam will be 42 degrees with respect to the input beam optical axis. For these types of gratings, deviations of more than several degrees from the optimal Bragg angle can result in large amounts of losses to the optical transmission efficiency.

Figure 4:
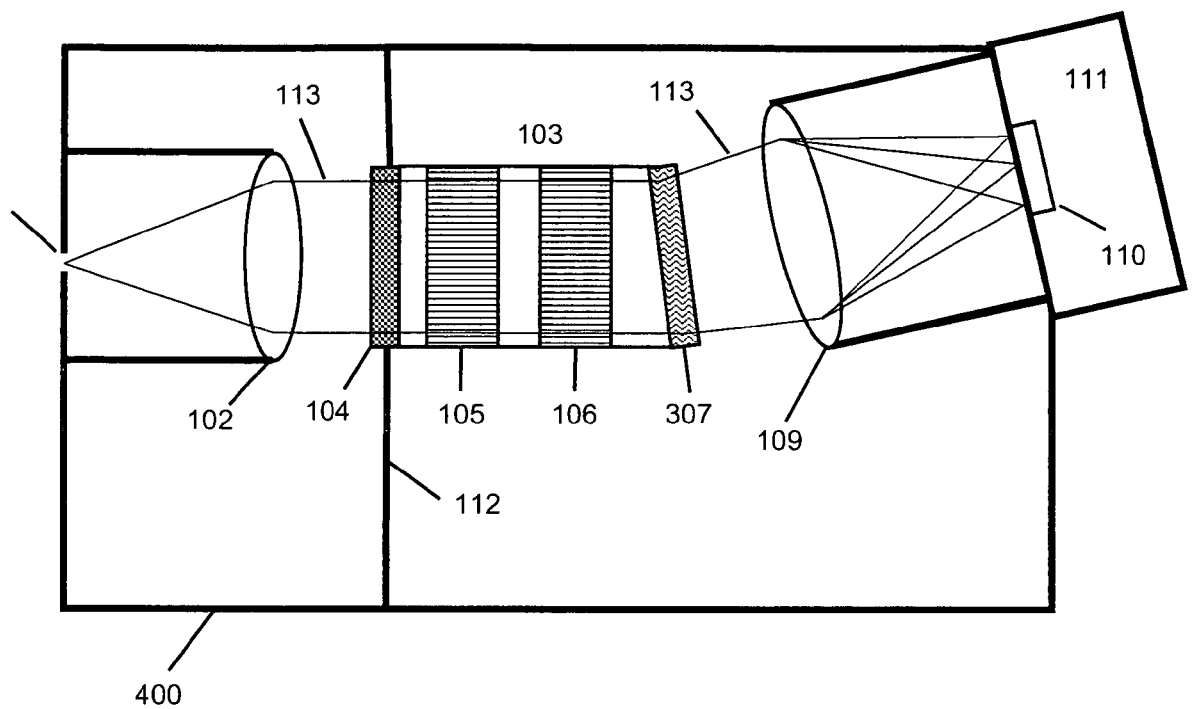
FIG. 4 provides a schematic of an alternate embodiment of a imaging Raman spectrograph similar to that described in FIGS. 1 and 3, but with the absence of the folding mirror, according to an alternate embodiment of the present invention.

FIG. 4 schematically depicts yet another alternate embodiment of the present invention, showing a configuration that does not use a beam folding mirror. In this embodiment, additional optical throughput can be achieved; eliminating the losses from the mirror reflection, and improving the overall imaging quality and reducing the parts count for lower cost of manufacture. In FIG. 4, the angled transmission grating 307 is also shown, but this is for illustration purposes only, as the grating can also be used in normal incidence as shown in FIG. 1. Note that in this embodiment, changing the central wavelength of the spectrograph requires a lateral translation of the detector array 110 and possibly the lateral location of the imaging lens 109.

Figure 5:
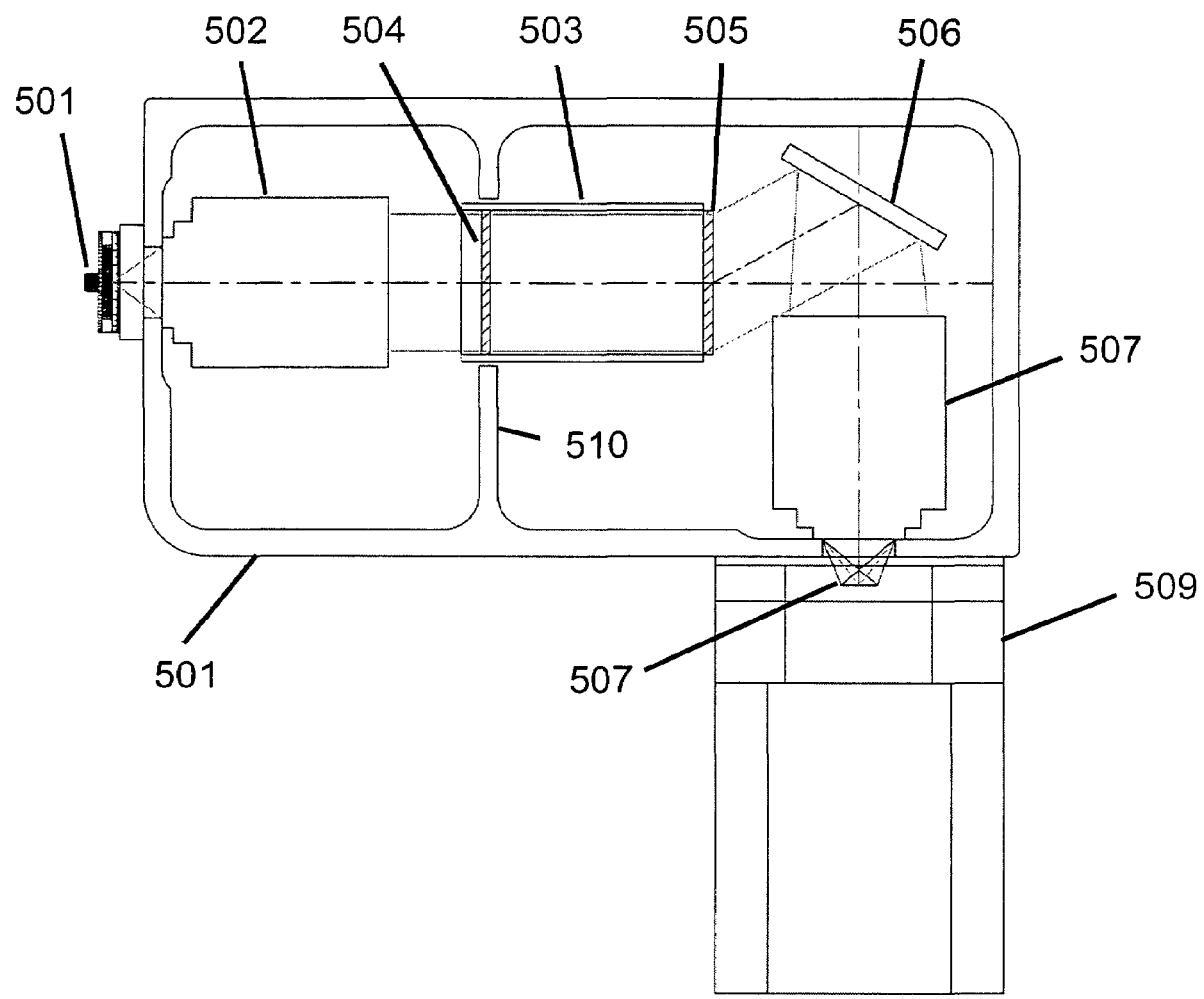
FIG. 5 provides a schematic of a preferred embodiment of the present invention showing a one-piece 'unibody' or 'bathtub' style design for the main optical housing and mainframe, according to one embodiment of the present invention.

FIG. 5 schematically shows a preferred embodiment of the present invention as implemented using a single-piece 'bath tub' style optical housing 500 that is computer numerical controlled (CNC) machined from a solid block of aluminum, the 1-inch format C-mount lenses 502 & 507 (75 mm f/1.4) mounted directly to threaded mounts machined into the housing, and a spectral filter assembly 503 that contains the spectral notch or long-pass optical filter 504, the 600 l/mm ruled transmission grating 505, the turning mirror 506, the 12 mm wide CCD sensor array 507, and the CCD camera housing 509. An internal optical baffle plate 510 machined into the main housing assembly provides a way to isolate the light scattered and rejected from the spectral filter assembly 503. In this embodiment, light is admitted to the spectrograph using a commercially available fiber optic coupling (such as an SMA 905 type multi-mode fiber optic connector fitting) 501 with a rotatable angle mount. Note that the optical channel plates are not shown here for simplicity.

Figure 6:
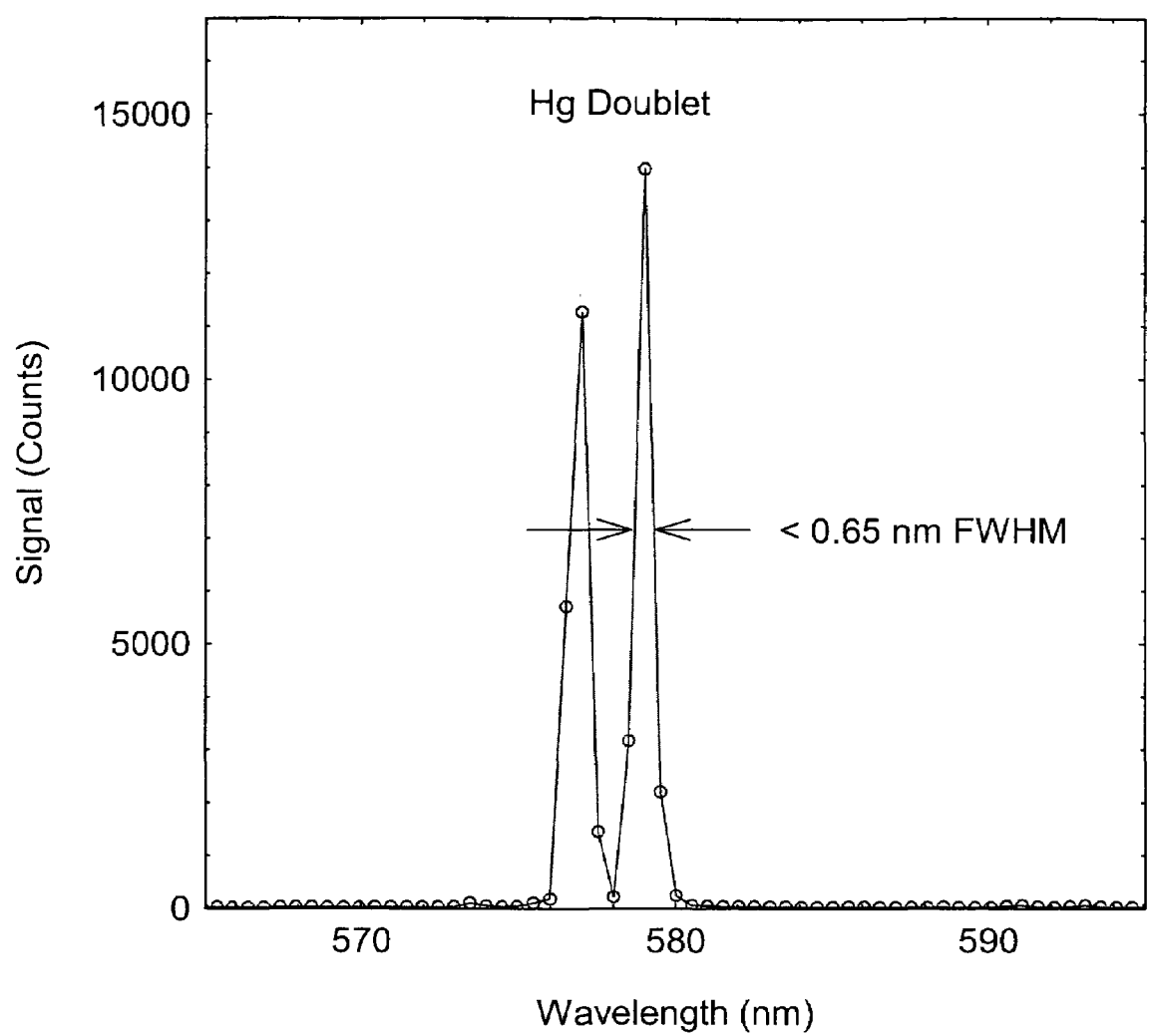
FIG. 6 provides the Hg-doublet emission line (near 578 nm) data from a HgAr discharge calibration lamp thus depicting the spectral imaging capabilities of the present invention, according to one embodiment of the present invention.

FIG. 6 provides data showing the spectral resolution of the present invention. Here, the Hg doublet near 578 nm from a gas-discharge Hg—Ar pencil lamp is coupled to the spectrograph using an 8 μm core diameter silica fiber optic cable, the light is then dispersed with a 600 l/mm ruled (replicated) AR coated transmission grating and detected with a thermo-electrically cooled 1024×256 pixel CCD array with 24 μm pixels. Both lenses in the spectrograph were 50 mm f/1.4 1-inch format C-mount lenses. The data in FIG. 6 clearly shows the excellent spectral imaging capability of the spectrograph in that it can resolve the Hg lines down to about 0.65 nm full-width at half-max (FWHM).

Figure 7:
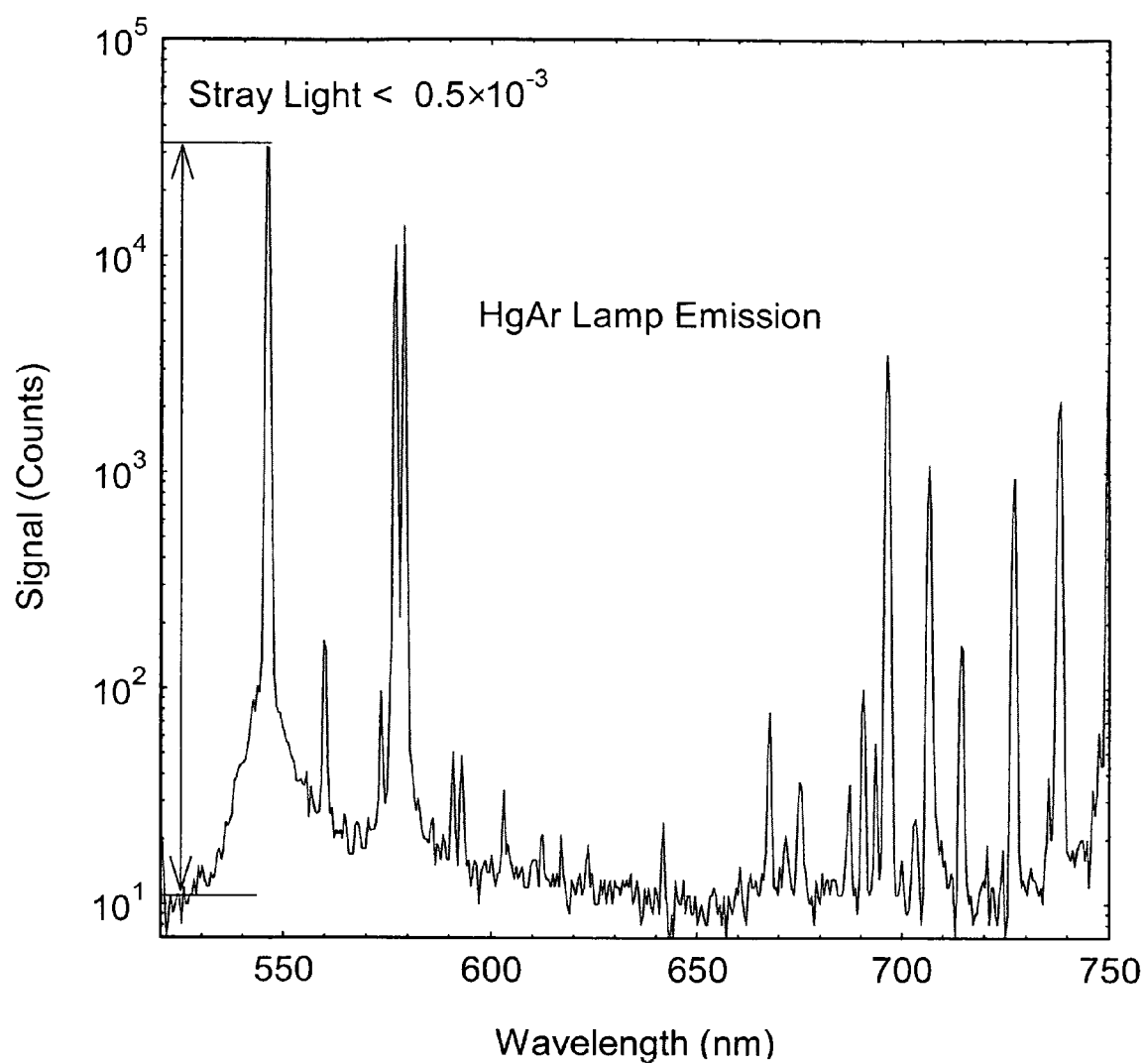
FIG. 7 provides the Hg—Ar discharge calibration lamp over the full spectral range of one of the configurations of the present invention, depicting the low stray light levels possible, according to one embodiment of the present invention.

FIG. 7 provides data showing the low stray-light levels that the present invention is capable of providing. The optical setup is identical to that described in FIG. 6. The signals are recorded and displayed on a log scale to demonstrate that the stray-light levels are less than $0.5 \times 10^{-3}$. The stray-light levels of a spectrograph are a function of the degree of light scattering from the optical element faces, media, internal surfaces, and optical baffling. The lower the stray-light, the greater the contrast between signal spectral lines of interest and the background noise levels. For the purposes of Raman scattering, assuming that the excitation wavelength is suppressed, the maximum signal-to-noise ratio or contrast for the Raman spectral features is approximately 2000:1.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

While in accordance with the patent statutes the best mode and preferred embodiment have been set forth, the scope of the invention is not limited thereto, but rather by the scope of the attached claims.

I claim the following:

1. A spectrograph comprising:
   a relay lens assembly having not more than a first and a second lens or lens assembly and further including a transmission grating, and a spectral filter assembly including a spectral filter, the first lens or lens assembly having positive optical power and collimating light from an input source; the transmission grating dispersing the collimated light from the first lens into different spectral components; the second lens or lens assembly having positive optical power and focusing the dispersed light from the transmission grating onto an optical detector; the spectral filter assembly located between the first lens and the transmission grating and mounted in an enclosed cylindrical structure with openings for admitting and transmitting light located on the faces of the cylindrical structure and removing the elastically scattered light from the input source and the spectral filter comprises an optical interference or absorption filter which attenuates the elastically scattered light wavelength; and
   the transmission grating being mounted to the spectral filter assembly as a single unit and comprising a plurality of opague, light-absorbing optical channel plates which limit the optical acceptance angle that can be transmitted through the spectral filter assembly;
   and an exit focal plane for the placement of at least one optical detector for measuring and converting the optical signals into electrical signals.

2. The spectrograph of claim 1 wherein a beam folding mirror is located after the transmission grating and the second lens diverting the light beam path from the transmission grating by an angle ranging from about 60° to about 120°.

3. The spectrograph of claim 1 wherein the focal ratio number of the first lens ranges from f/1.0 to f/2.8 and the focal length of the first lens range from 10 mm to 100 mm.

4. The spectrograph of claim 1, wherein the focal lengths of the first and second lens can be selectively changed.

5. The spectrograph of claim 1 wherein the input source includes one or more of a slit or an optical fiber of dimensions ranging from 5 μm to 200 μm core diameter.

6. The spectrograph of claim 1 wherein the input source is a plurality of optical fibers ranging from 2 fibers to approximately 200 fibers which are arranged to form a linear array similar to a slit.

7. The spectrograph of claim 1 wherein the optical detector comprises a charge coupled device array or a complimentary metal oxide semiconductor array.

8. The spectrograph of claim 1 wherein the optical detector is tilted to allow the effects of chromatic aberration to be compensated to permit a sharp focus of selected wavelengths.

9. The spectrograph of claim 1 wherein the optical filter is an interference notch filter or an interference long-pass filter utilizing multi-layer dielectric coatings.

10. The spectrograph of claim 9 wherein the optical filter uses volume phase holographic technologies.

11. The spectrograph of claim 1 wherein the optical channel plates have a hexagonal closest packed array configuration or a square or rectangular array pattern and limits the optical acceptance or transmission angles of the filter assembly to about 5 degrees or less.

12. The spectrograph of claim 1 wherein one or more optical channel plates are spaced apart along the axis of light propagation of the spectral filter assembly axis.

13. The spectrograph of claim 1 wherein the optical channel plates have channel width dimensions ranging from 1 mm to 10 mm, and optical channel plate thickness ranging from 5 mm to 50 mm.

14. The spectrograph of claim 1 wherein the optical channel plates comprise one or more of metal, plastic, ceramic, paper having a matte black finish.

15. The spectrograph of claim 1 wherein the transmission grating is mounted at the exit plane of the cylindrical shaped assembly.

16. The spectrograph of claim 1 wherein the transmission grating is a ruled conventional transmission grating.

17. The spectrograph of claims 1 wherein the shape of the spectral filter assembly housing is a rectangular prism shape, such that the entrance and exit optical planes coincide with the small faces of the rectangular prism-shaped spectral filter assembly housing.

18. The spectrograph of claim 1 wherein the second lens is coaxially aligned with a first-order diffraction beam path from the transmission grating.

19. The spectrograph of claim 18 wherein the second lens and optical detector are coaxially aligned with the first-order diffraction beam path and are mounted to effect a change of the central wavelength of the spectrograph system by means of precision mechanical or electro-mechanical system.

20. The spectrograph of claim 1 wherein the spectrograph transmits or disperses light having wavelengths from about 350 nm to about 1000 nm.

21. The spectrograph of claim 1 further including a main optical housing which is a one-piece unibody construction.

22. A spectrograph comprising:
a relay lens assembly having not more than a first and a second lens or lens assembly and further including a transmission grating, and a spectral filter, the first lens or lens assembly having positive optical power and collimating light from an input source; the transmission grating dispersing the collimated light from the first lens into different spectral components; the second lens or lens assembly having positive optical power and focusing the dispersed light from the transmission grating onto an optical detector;
the spectral filter assembly located between the first lens and the transmission grating and removing the elastically scattered light from the input source;
a beam folding mirror located after the transmission grating and the second lens; and
an exit focal plane for the placement of at least one optical detector for measuring and converting the optical signals into electrical signals.

23. The spectrograph of claim 22 wherein the transmission grating diverts the collimated light by an angle of from about 60° to about 120°.

24. The spectrograph of claim 22 wherein the focal length of the first or second lens or lens assembly can be selectively changed.

25. A spectrograph comprising:
a unitary housing containing not more than a first and a second lens or lens assembly and further including a transmission grating, and a spectral filter, the first lens or lens assembly having positive optical power and collimating light from an input source; the transmission grating dispersing the collimated light from the first lens into different spectral components; the second lens or lens assembly having positive optical power and focusing the dispersed light from the transmission grating onto an optical detector; the spectral filter assembly located between the first lens and the transmission grating and removing the elastically scattered light from the input source;
a beam folding mirror located after the transmission grating and the second lens;
and an exit focal plane for the placement of at least one optical detector for measuring and converting the optical signals into electrical signals.

* * * * *